(12) United States Patent
Gaynes et al.

(10) Patent No.: US 6,344,099 B1
(45) Date of Patent: Feb. 5, 2002

(54) TFT PANEL ALIGNMENT AND ATTACHMENT METHOD AND APPARATUS

(75) Inventors: Michael A. Gaynes, Vestal; Allan O. Johnson, Johnson City; Ramesh R. Kodnani; Mark V. Pierson, both of Binghamton; Edward J. Tasillo, Newark Valley, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/668,141

(22) Filed: Sep. 25, 2000

Related U.S. Application Data (62) Division of application No. 09/071,675, filed on May 1, 1998, now Pat. No. 6,129,804.

(51) Int. Cl.[7] ............................................. B32B 31/00
(52) U.S. Cl. ....................... 156/64; 156/275.5; 156/300
(58) Field of Search .............................. 156/64, 222.2, 156/225.5, 295, 297, 298, 300, 299

(56) References Cited

U.S. PATENT DOCUMENTS 5,889,568 A * 3/1999 Seraphim et al. ............. 349/73

* cited by examiner

Primary Examiner—James Sells
(74) Attorney, Agent, or Firm—Connolly Bove Lodge & Hu; Lawrence R. Fraley, Esq.

(57) ABSTRACT

A system for aligning and attaching together a plurality of thin film transistor tiles for constructing a flat panel display. A coverplate loading station where a coverplate that the tiles are to be attached to is arranged on a coverplate support. A coverplate bonding material dispensing station where a bonding material for bonding the tiles to the coverplate is applied to a surface of the coverplate. A tile placement station where the tiles are arranged on the coverplate. A tile aligning and securing station where the tiles are aligned relative to each other and the coverplate by the tile aligner and where the tiles are at least partially bonded to the coverplate. A tile assembly bonding material dispensing station where a bonding material is applied to a surface of the tiles opposite the side that the coverplate is bonded to. A backplate placement station where a backplate is arranged on the tiles. A backplate aligning and securing station where the backplate is aligned with the tiles and the coverplate and at least partially secured to the tiles. A full bonding station where the tiles are fully bonded to the coverplate and the backplate.

11 Claims, 4 Drawing Sheets

TFT PANEL ALIGNMENT AND ATTACHMENT METHOD AND APPARATUS

This application is a division application of U.S. patent application Ser. No. 09/071,675 filed May 1, 1998, now U.S. Pat. No. 6,129,804.

FIELD OF THE INVENTION

The invention relates to a method and apparatus for forming a flat panel display by combining a plurality of individual display devices.

BACKGROUND OF THE INVENTION

The size of an individual display device such as a liquid crystal display (LCD) element typically is limited by acceptable manufacturing yields using currently known techniques. It would therefore advantageous to be able to combine several individual display devices together to produce either a larger display or to mount individual display devices in various positions on a larger display panel. For example, in the computer, television, and entertainment industries, large area displays of a size much larger than single display device sizes are desired for viewing by groups of people or single individuals.

In such applications, close placement and alignment of individual display devices to each other are critical parameters in order to make the edges of the display devices inconspicuous. That is, it is desirable to ensure no breaks are visible as information is viewed across the boundaries from display device to display device. Automotive and aircraft dashboard panels may require information such as speed, temperature, and fuel level to be displayed in various positions, sometimes with large gaps between these positions, on a large overall display panel.

One method of forming a display panel is to clamp individual display elements between two glass plates using screws or other tighteners and brackets of various design about the edges of the glass plates. Individual display elements may then be viewed through one of the glass plates. The display can be illuminated, if necessary, by placing a light source behind the second glass plate. Such a method is set forth, for example, in U.S. Pat. No. 4,156,833, the entire disclosure of which is hereby incorporated by reference.

Both the illuminating radiation (hereinafter referred to as "light") as well as the display device image must, of necessity, pass through one or more of the glass plates. Optical properties of the glass plates (such as the transmission/absorption spectrum, and reflectance properties of both surfaces) are important design parameters that can affect display panel performance. These parameters can possibly cause reductions in brightness, contrast, and resolution. Consequently, it is important to select a glass material and surface treatment with care and to minimize the number of layers and interference surfaces through which the images and illuminating light must pass. Obvious variations of this overall structure are possible using optically transparent materials other than glass, such as various plastics, or even opaque materials, for the backplate in applications where reverse illumination is not needed.

Placing and holding individual display devices in accurate alignment prior to clamping the glass plates together has been difficult to achieve due to extremely precise requirements on alignment accuracy and the possibility of shifting one or more devices previously aligned as others are added prior to clamping all of these in place.

It is also beneficial to provide a seal to prevent dust, moisture, and/or other contaminants, from entering the display panel after assembly. Including a seal during clamping can add complexity and difficulty to the clamping process.

Various methods which are the subject of other patents have been developed for making electrical connection to each of the display elements, or for providing electrical interconnection between these. Connections can be made by overlapping edges of display elements as shown in U.S. Pat. Nos. 5,164,853 and 4,408,836 and Japanese patent JA 0302222, or by abutting corresponding conductive pads on edge surfaces of adjacent display elements as shown in U.S. Pat. No. 5,067,021. The entire contents of the four patents immediately above are hereby incorporated herein by reference. Any of the above or other connection schemes can be employed in the present invention.

SUMMARY OF THE PRESENT INVENTION

It is an object of the present invention to provide a device for aligning and attaching a plurality of individual display devices to result in a larger display device.

Another object of the present invention is to provide a method for aligning and attaching a plurality of individual display devices utilizing the apparatus of the present invention.

An additional object of the present invention is to provide a system for assembling a flat panel display from a plurality of smaller display panels including a plurality of stations for carrying out various operations in the assembly process.

A further object of the present invention is to provide a method for assembling a flat panel display from a plurality of smaller individual display panels utilizing an apparatus including a plurality of stations for carrying out various steps in the method.

In accordance with these and other objects and advantages, aspects of the present invention provide a system for aligning and attaching together a plurality of thin film transistor tiles for constructing a flat panel display. The apparatus includes a coverplate loading station where a coverplate that the tiles are to be attached to is arranged on a coverplate support. At a coverplate bonding material dispensing station, a bonding material for bonding the tiles to the cover plate is applied to a surface of the coverplate. The tiles are arranged on the cover plate at a tile placement station. At a tile aligning and securing station, the tiles are aligned relative to each other and to the coverplate by a tile aligner. At the station, the tiles are also at least partially bonded to the coverplate. A bonding material is applied to a surface of the tiles opposite the side of the tiles that the coverplate is bonded to at a tile assembly bonding material dispensing station. At a backplate placement station, a backplate is arranged on the tiles. The backplate is aligned with the tiles and coverplate at a backplate aligning and securing station. At the backplate aligning and securing station, the backplate is also at least partially secured to the tiles. The tiles are fully bonded to the coverplate and the backplate at a full bonding station. The assembly of the coverplate, tiles and backplate is finalized at a final assembly output station. At the final station, the completed assembly may be prepared for transport to another operation and/or for storage until needed in a further operation.

Other aspects of the present invention provide a method of aligning and attaching together a plurality of thin film transistor tiles for constructing a flat panel display. According to the method, a coverplate that the tiles are to be attached to is placed on a coverplate support at a coverplate loading station. A bonding material is applied to the coverplate for bonding the tiles to the coverplate onto the coverplate at a coverplate bonding material dispensing station. A plurality of tiles are arranged on a tile support at a tile loading station. The tiles are connected to a tile aligner. The tiles are arranged on the coverplate at a tile placement station. Then tiles are aligned relative to each other and to the coverplate by the tile aligner and at least partially bonding the tiles to the coverplate at a tile aligning and securing station. A bonding material is applied to a surface of the tiles opposite the side that the coverplate is bonded to at a tile assembly bonding material dispensing station. A backplate is arranged on the tiles at a backplate placement station. The backplate is at least partially bonded to the tiles at a backplate aligning and securing station. The coverplate and the backplate are fully bonded to the tiles at a full bonding station.

Still other objects and advantages of the present invention will become readily apparent by those skilled in the art from the following detailed description, wherein it is shown and described only the preferred embodiments of the invention, simply by way of illustration of the best mode contemplated of carrying out the invention. As will be realized, the invention is capable of other and different embodiments, and its several details are capable of modifications in various obvious respects, without departing from the invention. Accordingly, the drawings and description are to be regarded as illustrative in nature and not as restrictive.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

The present invention provides a system for aligning and attaching together a plurality of thin film transistor tiles 100 for constructing a flat panel display. A typical embodiment of the apparatus may include a coverplate loading station where a coverplate 101 that the tiles are to be attached to is arranged on a coverplate support. At a coverplate bonding material dispensing station, a bonding material for bonding the tiles to the cover plate is applied to a surface of the coverplate.

The tiles may be arranged on the cover plate at a tile placement station. At a tile aligning and securing station, the tiles are aligned relative to each other and to the coverplate by a tile aligner. At the station, the tiles are also at least partially bonded to the coverplate. A bonding material is applied to a surface of the tiles opposite the side of the tiles that the coverplate is bonded to at a tile assembling bonding material dispensing station.

At a backplate placement station, a backplate is arranged on the tiles. The backplate is aligned with the tiles and coverplate at a backplate aligning and securing station. At the backplate aligning and securing station, the backplate is also at least partially secured to the tiles.

The tiles are fully bonded to the coverplate and the backplate at a full bonding station. The assembly of the coverplate, tiles and backplate is finalized at a final assembly output station. At the final station, the completed assembly may be prepared for transport to another operation and/or for storage until needed in a further operation.

Figure 4:
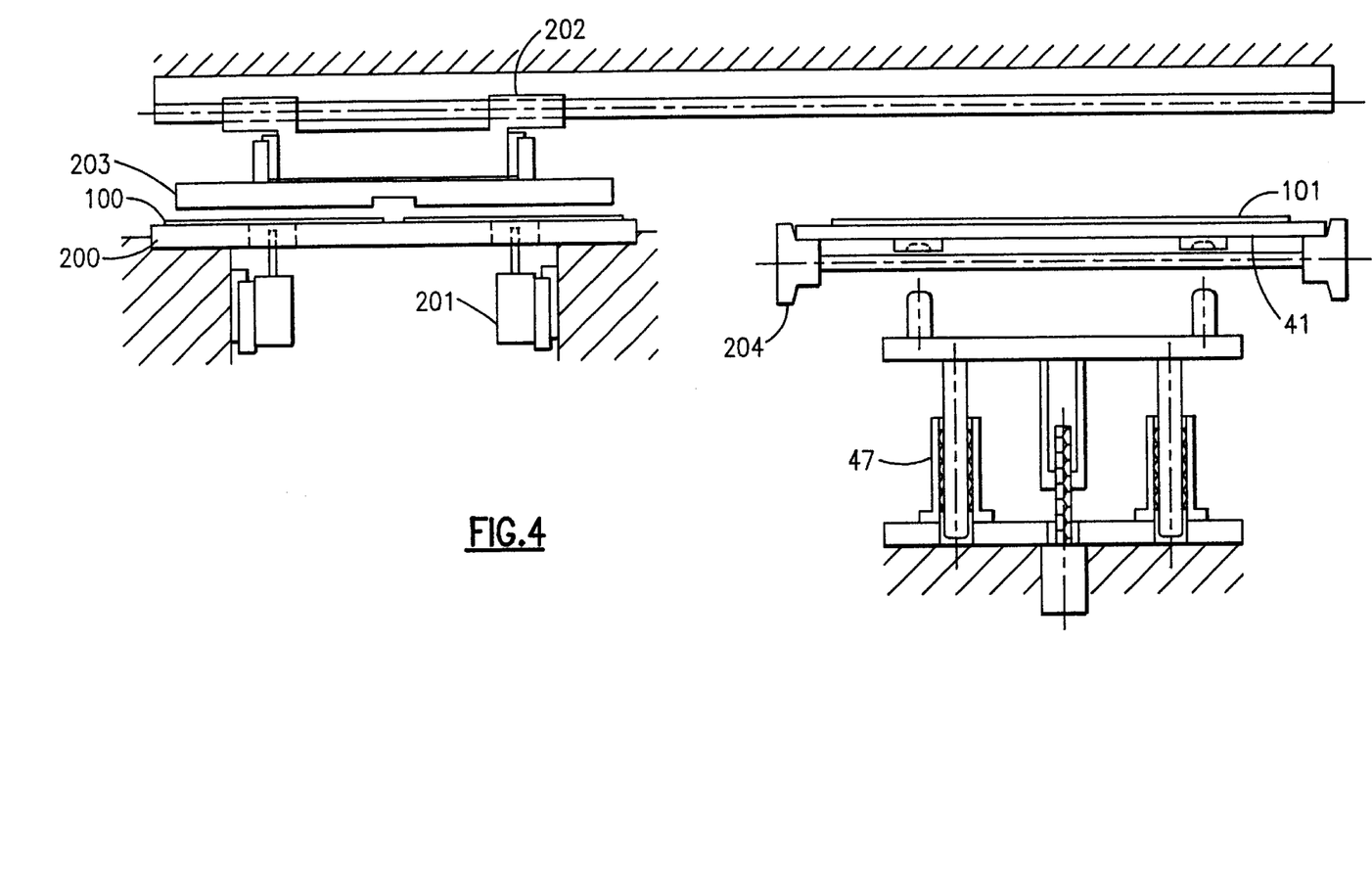
FIG. 4 represents a cross-sectional view of an embodiment of a tile load station and an embodiment of a tile align and secure station according to the present invention, illustrating a relationship between the two stations.

The system may also include a staging/cleaning area where an empty assembly fixture 41, shown in FIG. 4, may be transferred after removed of the completed assembly. At the staging/cleaning area, any adhesive or other contaminants that may be present on the assembly fixture may be removed prior to reusing the assembly fixture.

Figure 1:
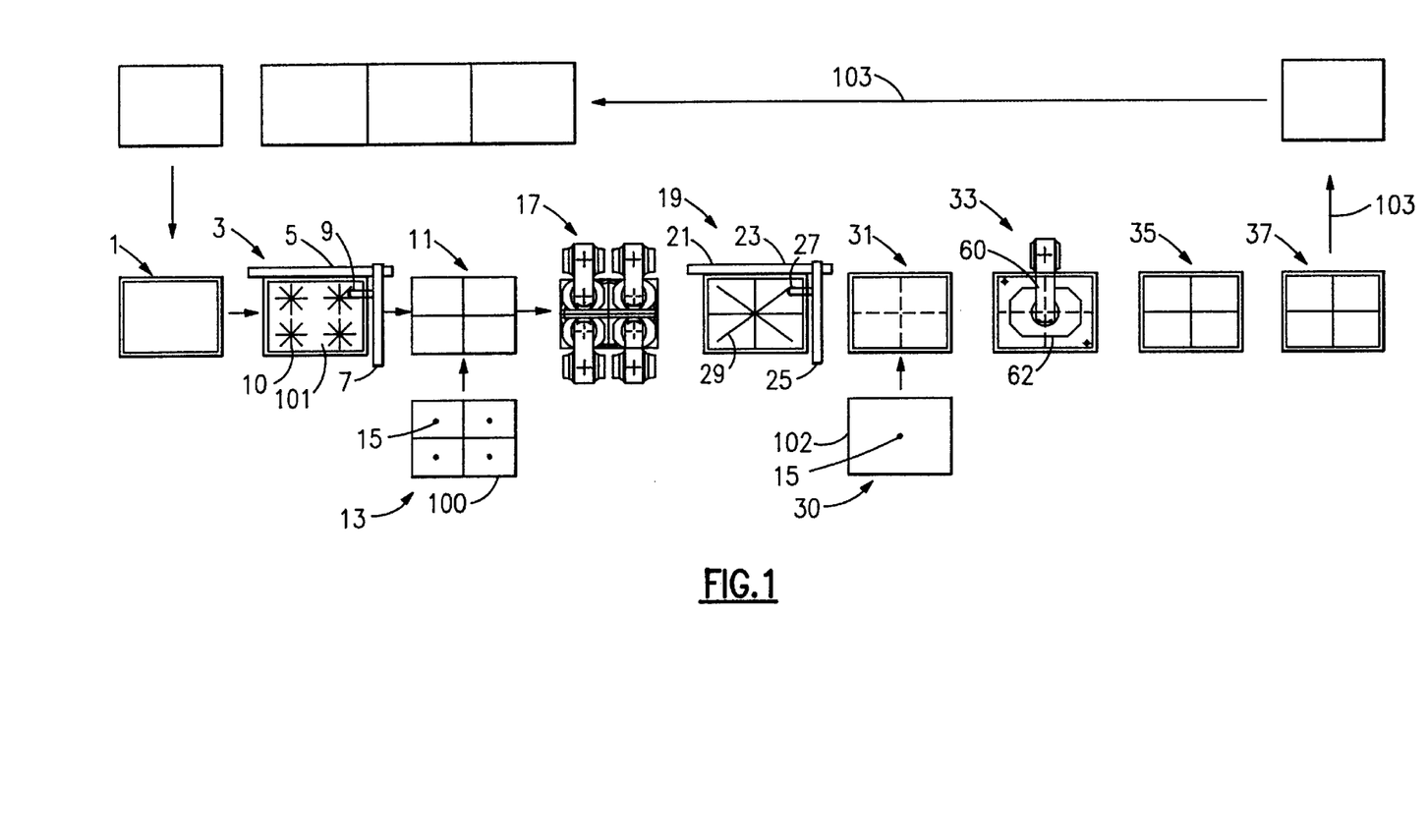
FIG. 1 represents an overhead view of an embodiment of a system for aligning and attaching together a plurality of individual thin film transistor tiles for constructing a flat panel display according to the present invention.

FIG. 1 illustrates an embodiment of a system according to the present invention. As illustrated in FIG. 1, a system according to the present invention may include a coverplate load station 1. At the coverplate load station 1, a coverplate may be manually or automatically loaded onto a coverplate fixture. An embodiment of the assembly fixture is illustrated in cross section in FIG. 2.

Figure 2:
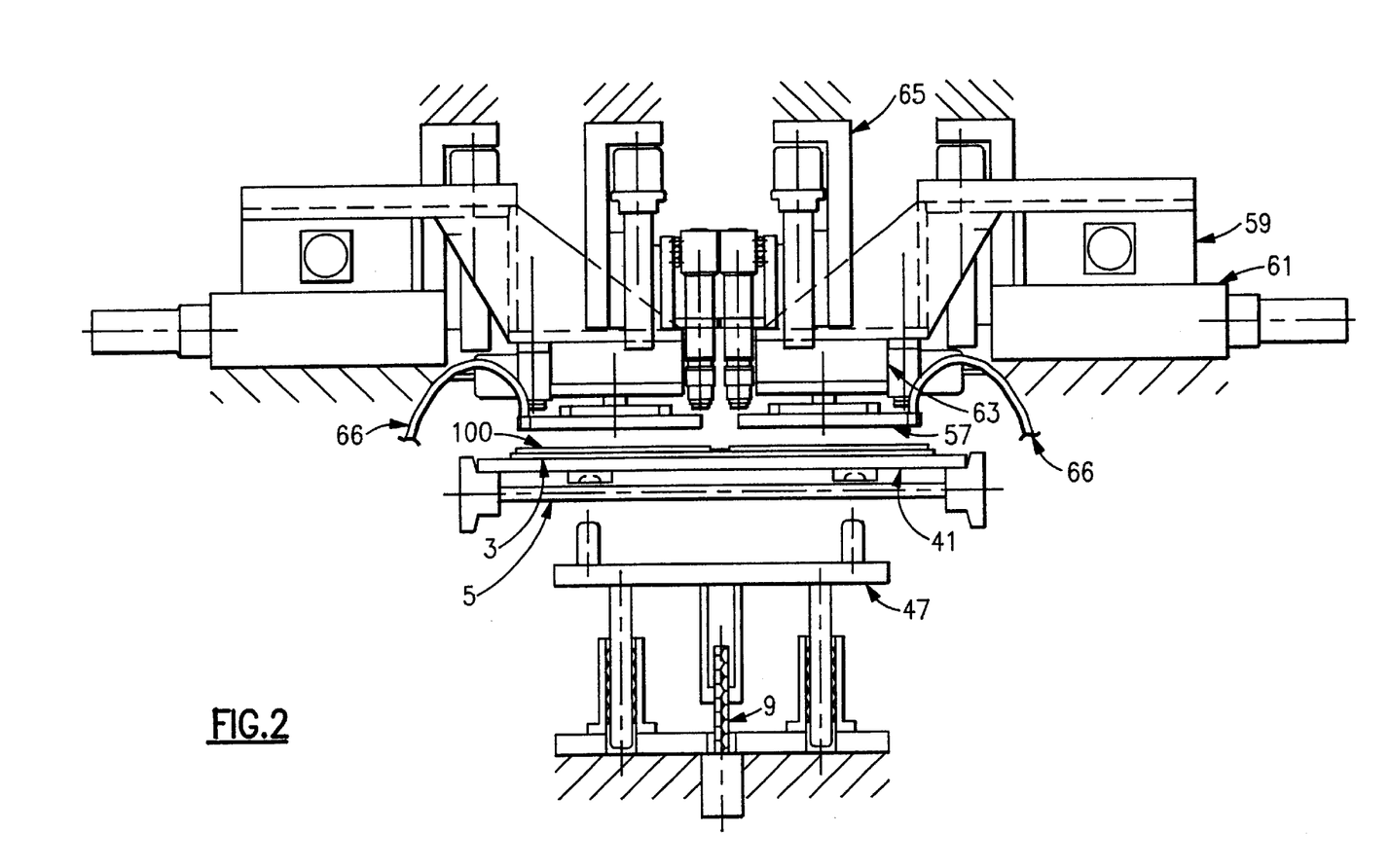
FIG. 2 represents a cross-sectional view of an embodiment of a tile align and secure station according to the present invention.

The assembly fixture may include a set of guideposts and an opposing spring-loaded device to push the coverplate against the guidepost. The assembly fixture may also include a vacuum source to maintain the coverplate flat and tight on the assembly fixture.

The assembly fixture may include clamps for maintaining the coverplate, the tiles and/or a backplate, on the assembly fixture. At various stages in the assembly process, at least one of the coverplate, the tiles, and the backplate may be arranged on the assembly fixture at various times. One embodiment of the present invention utilizes swinging vacuum clamps on the assembly fixture. However, any other clamps, such as mechanical or other clamps may be utilized to maintain the coverplate, tiles, and backplate on the assembly fixture during the assembly process.

Since a vacuum may be utilized to maintain the coverplate flat and tight on the assembly fixture as well as vacuum clamps, the present invention may include a vacuum source including an apparatus to provide and maintain the vacuum on the fixture during and between assembly stations of the system.

The assembly fixture with the coverplate loaded on it may then be transported through the system. The system and various stations within the system may be interconnected with a conveyor 204, shown in FIG. 4. The conveyor could include rollers or a belt, for example. The conveyor and/or the assembly fixture may be powered to move the assembly fixture from station to station.

Each station system may be working on an assembly simultaneously. To maximize the output, preferably, an assembly fixture may be present at each station at all times. The maximum through-put of the system typically would then be dictated by the slowest process in the overall system.

After loading the coverplate on the assembly fixture, the assembly fixture may be transported by or over the conveyor to a coverplate bonding material dispensing station 3. At the coverplate bonding material dispensing station 3, a bonding material for bonding the tiles to the coverplate may be applied to a surface of the coverplate. Typically, the bonding materials applied to the surface of the coverplate shown facing up in the embodiment shown in FIG. 1.

The coverplate bonding material dispensing station may include an apparatus for dispensing the bonding material on the surface of the coverplate. Any type of apparatus may be utilized for dispensing the bonding material. The apparatus in the embodiment shown in FIG. 1 includes an x-y bonding material dispenser. Such a dispenser typically includes two arms 5 and 7. The arms may interact with each other. For example, the arm 7 may ride along the arm 5.

The bonding material dispenser also typically includes a dispensing nozzle 9 that may ride along the arm 7. Accordingly, the bonding material dispenser may dispense bonding material at any point on the surface of the coverplate by altering the position of arm 7 and nozzle 9.

The adhesive may be applied and according to any known pattern. For example, the bonding material could be substantially uniformly deposited on the entire surface of the coverplate. According to one pattern, the bonding material is applied to the surface of the coverplate in a star or asterisk pattern.

The star pattern may be generated on the coverplate by controlling the path of the nozzle and the nozzle's on/off control. The star pattern may be created by depositing bonding material from the nozzle while simultaneously moving the nozzle in repeated straight lines, including horizontal, vertical, and angled 45 degrees from the horizontal and vertical lines. Such lines of bonding material may be formed such that the lines intersect at a point where the center of a tile will be arranged.

The nozzle during such an operation will be on during the movement along the lines described above. Otherwise, the nozzle will be off such that bonding material will not flow from the nozzle. The volume of bonding material that will be dispensed from the nozzle may be a function of flow rate of bonding material from the nozzle. The volume of bonding material that will be dispensed from the nozzle may also be a function of the velocity of the nozzle as it deposits the lines of bonding material. These parameters may be easily determined through routine experimentation. Typically, the deposition of the bonding material is carried out so as to ensure that the entire mating surfaces of the tile and the coverplate are covered with adhesive.

Examples of bonding materials that may be utilized to secure the tiles to the coverplate include adhesives. Examples of suitable adhesives include LUXTRAK 4031, LUXTRAK 4170 and LUXTRAC 4116, all available from Ablestik Labs, or VLC701, available from Glotrax Incorporated. Preferably, the bonding material is optically clear when cured.

After dispensing of the bonding material on the coverplate, the assembly fixture may be transported to a tile placement and bonding material dwell station 11. In preparation for the arrival of the coverplate covered with bonding material at the tile placement and adhesive dwell station, tiles may be arranged on a tile shuttle system at a tile load station 13. At the tile load station 13, tiles may be manually loaded onto a tile load fixture.

FIG. 4 illustrates tiles 100 arranged on a tile load fixture 200. A bonding material dispenser 201 is provided to deposit bonding material on the tiles 100. A tile chuck(s) 203, discussed in greater detail below, may be arranged above the tiles 100. The position of the tiles and tile chuck(s) may be altered by a tile shuttle system 202.

The tiles may be arranged on the tile load fixture in any pattern. According to one example, the tiles are arranged on the tile load fixture approximately $1/16$ of an inch from each other. However, the tiles may be arranged any distance from each other.

The tile load station may include a bonding material dispenser for depositing at least a small portion or at least one seed dot of a bonding material 15 on the lower surface of the tiles, in other words, the surface facing away from the viewer of the orientation shown in FIG. 1. The bonding material seed dot dispenser, therefore, typically is arranged such that it can access the underside of the tiles.

A typically known bonding material or adhesive dispenser could be utilized to deposit the seed dots on the tiles. The present invention may include more than one seed dot adhesive dispenser. In fact, typically, the present invention may include four separate dispensers. The dispensers may each access the tiles through a hole in the tile load fixture, as illustrated in FIG. 4.

Preferably, the seed dot is deposited in the vicinity of the center of each of the tiles. The seed dot functions to help ensure that the tiles contact the adhesive on the coverplate at a controlled point. Accordingly, preferably, the seed dot is placed such that it will align with and engage the center of the star glue pattern placed on the coverplate.

Accordingly, the center of each of the star patterns of the bonding material placed on the coverplate preferably are arranged such that they will engage the seed dot on the tiles. When the tiles are aligned and lower on the coverplate for bonding, the seed dot on the tiles engages the center of the star pattern on the coverplate. The spreading of the bonding material continues radially, sweeping the air out between the surfaces of the tiles and the coverplate.

Once the tiles are loaded into the tile shuttle and adhesive dot placed on them, the tiles are transported to be placed on the coverplate arranged at the tile placement and bonding material dwell station 11.

Alternatively, the present invention may not include a tile shuttle system or tile load station or even a seed dot dispenser. All of these procedures may be carried out at another area. These procedures could even be carried out manually by hand.

To accomplish loading of the tiles on the coverplate, the present invention may include a tile shuttle, as in the embodiment shown in FIG. 1. The tile shuttle may pick up the tiles from the tile load fixture. As such, the tile shuttle includes apparatus to engage and retain the tiles to transport them from the tile load fixture to the coverplate. According to one embodiment, the tile shuttle includes a vacuum source for engaging and retaining the tiles. However the present invention may include any apparatus for engaging and retaining the tiles, such as a mechanical gripping apparatus.

In the embodiment shown in FIG. 1, the tile shuttle engages the tiles, the vacuum system in the shuttle then picks up the tiles. The tile shuttle then transports the tiles from the tile load fixture to the coverplate. The tiles are lowered onto the coverplate in a controlled manner. Alternatively, the coverplate can be raised up to the tiles using an elevator system 47 such as that shown in FIG. 4. The rate that the tiles and the coverplate engage each other is typically from about one to about four minutes for a tile having dimensions of about 10 inches by about 12 inches, utilizing an adhesive having a viscosity of about 1000 centipoise as the bonding material.

The tile shuttle may engage only a portion of the upper surface of the tiles. Since the tiles are transparent, this may enable viewing of at least a portion of the bonding material as the tile is lowered onto the cover plate and as the bonding material subsequently flows between the tile and the coverplate. This can help to ensure complete coverage of a space between the tile and the coverplate as well as monitoring for full formation in the bonding material.

Although the tile shuttle may apply force to the tile as it causes the tile to engage the coverplate, typically, the tile shuttle is compliant in the z-direction and counterbalanced. Therefore, the force of the tile on the adhesive and the coverplate typically is negligible. In fact, a compliant and counterbalanced tile shuttle may permit essentially only the weight of the tile to apply force on the bonding material. According to such an embodiment, the weight of the tiles and the viscosity of the bonding material primarily will determine the final thickness of the bonding material.

Alternatively, the tile shuttle may not be entirely compliant in the z-direction. This may permit more control over the thickness of the layer bonding material between the tile and the coverplate. According to such an embodiment, the tile shuttle may force the adhesive to a specific gap between the tiles and the coverplate. Such an embodiment may include spacers to help control the spacing between the tiles and the coverplate.

Alternatively, according to such an embodiment, the position of the tile shuttle may be controlled in the z-direction. In this alternative, the shuttle may simply be lowered to a specific point and stopped.

After placement of the tiles on the coverplate, the assembly of the tiles, bonding material and coverplate may be permitted to sit or dwell at the tile placement and bonding material dwell station 11. After placement of the tiles on the coverplate, clamps on the assembly fixture, which up until placement of the tiles accommodated only the coverplate, may move to secure the tiles at least in the x and y directions. The clamps may permit movement in the z-direction.

As discussed above, clamps on the assembly fixture may be spring loaded or vacuum actuated clamps. Preferably, the clamps permit freedom of movement of the tiles in the z-direction. At this point, the tiles preferably have been disengaged by the tile shuttle. Clamps permitting movement of the tiles in the z-direction will permit the characteristics of the bonding material and the weight of the tiles to determine the gap between the tiles and the coverplate.

Typically, if permitted to dwell, the tiles are permitted to dwell on the coverplate for a period of from about 1 to about 2 minutes. However, the tiles may be permitted to dwell as short time period or as long a time period as is necessary to ensure the desired spread of bonding material between the tiles and the coverplate, to help eliminate air bubbles in the bonding material between the tiles and the coverplate, and/or to generate a desired gap between the tiles and the coverplate.

Typically, from the time that the tiles are placed on the coverplate by the tile shuttle to the time that the coverplate bonding material and tile assembly moves to the next station for the alignment of the tiles, the tiles are maintained in the x and y directions by the clamps, as discussed above. Of course, alignment of the tiles may require movement of the tiles in the x and y directions. Therefore, typically, the clamps need to be released prior to tile alignment.

After the desired state, such as thickness and spread in the x and y directions of bonding material between the tiles and the coverplate is achieved, the fixture assembly may moves or is moved from the tile placement and bonding material dwell station to a tile align and secure station 17.

Figure 3:
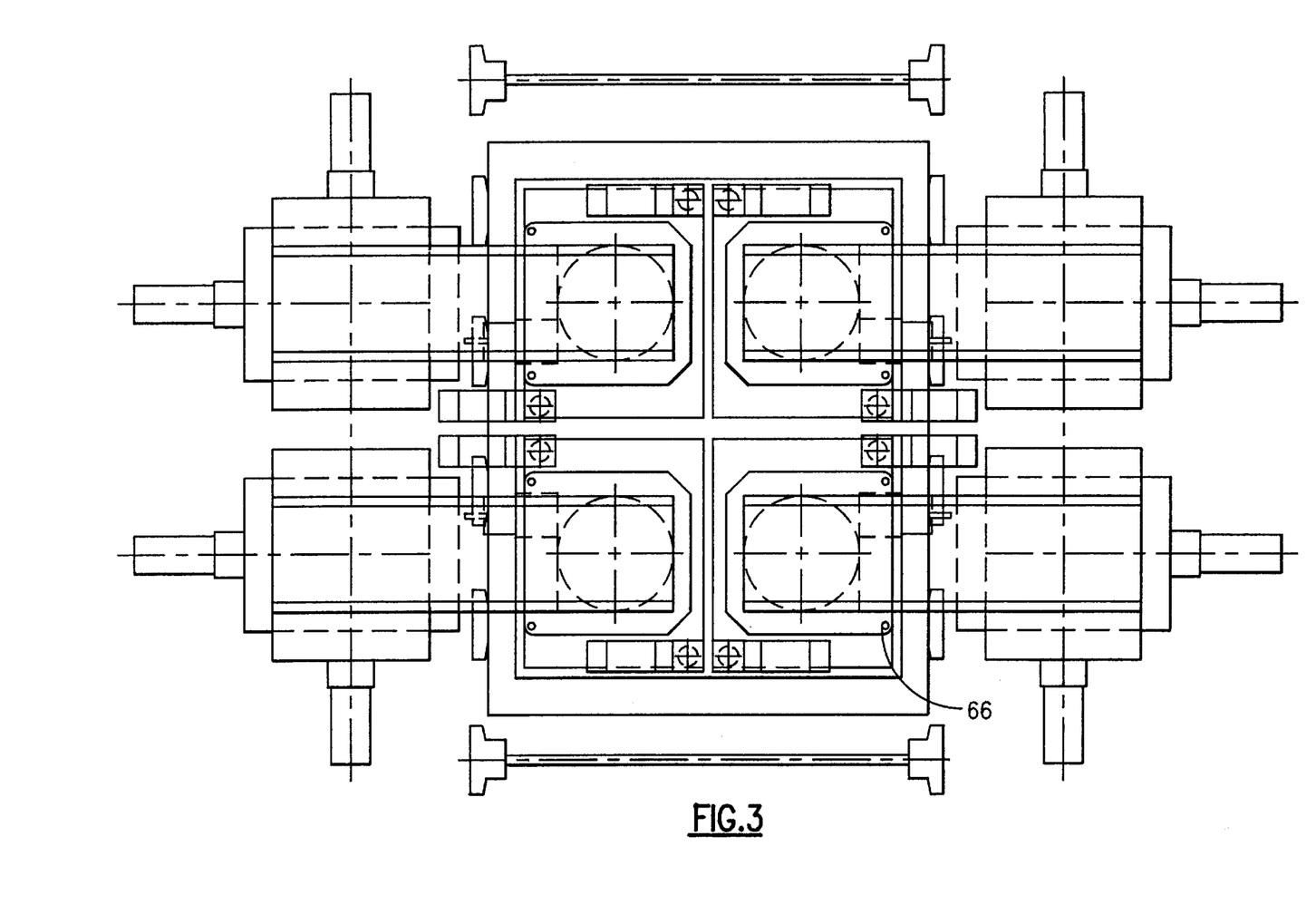
FIG. 3 represents an overhead view of an embodiment of a tile align and secure station according to the present invention.

FIGS. 2 and 3 illustrate more detailed side and overhead views of the tile align and secure station. The tile align and secure station may include an assembly fixture elevator 47. The assembly fixture elevator 47 may be utilized to alter a vertical position of the assembly fixture 41 and any elements of the display arranged on the assembly fixture. Any type of apparatus for altering the vertical position of an element such as the assembly fixture 41 may be utilized in the assembly fixture elevator according to the present invention. Those skilled in the art would be able to determine such a device easily. Accordingly, a detailed description of such device is not included herein.

The assembly fixture 41 may include means for retaining on the assembly fixture the coverplate and any elements arranged on the coverplate. For example, the assembly fixture may include clamps that retain the coverplate on the assembly fixture. According to another embodiment, the assembly fixture includes a vacuum source for retaining the coverplate on the assembly fixture.

The assembly fixture 41 may also include means for retaining the tiles or backplate. For example, the assembly fixture may include swinging vacuum clamps for retaining the tiles and/or the backplate on the assembly fixture. Such clamps may be especially useful for retaining the tiles and/or backplate during the time between their rough placement and arrangement on the coverplate, in the case of the tiles, or on the tiles, in the case of the backplate, and the time at which the tiles and/or backplate are aligned and attached.

In addition to the above, according to some embodiments, the means for retaining the coverplate, tiles, and/or backplate on the assembly fixture 41, may only immobilize the coverplate, tiles, and/or backplate in the x and y directions.

The assembly fixture elevator 47 may be utilized to bring the coverplate, tiles, and/or backplate into a position where tile engaging, supporting, and aligning means may engage the tiles. According to one embodiment, the elevator includes a motor driven ballscrew to actuate a set of lift posts that protrude up through the assembly fixture conveyor to access the bottom of the assembly fixture.

Tiles 100, each of which represents an individual flat panel LCD display, are placed upon the coverplate 101 at the beginning of the process of the present invention for forming a larger flat panel display. The tile align and secure station may include means for engaging, retaining, and altering position of each of the tiles. These three functions may be carried out by three or more separate means. Alternatively, the means may be combined into one device, such as by being connected together.

The embodiment illustrated in FIG. 2 includes a tile chuck 57. The tile chuck preferably includes means for engaging and retaining the tiles. According to one embodiment, the tile chuck includes a vacuum source to hold the tile. However, the present invention may include other apparatus for holding the tiles. For example, the apparatus could include clamps.

Preferably, the tile chuck is compliant in movements that are not parallel to the upper surface of the tiles and coverplates. In other words, preferably, the tile chuck is complaint in pitch, roll, and the z axis direction. However, the chuck may be under motor control and non-compliant in directions parallel to the upper surface of the tiles and/or the coverplate. In other words, the chuck preferably under motor control in the x and y and directions and rotationally in the x-y plane.

By permitting the chuck to be compliant in the pitch, roll and z axis directions, the thickness of the tiles and thickness of the bonding material may be absorbed in these compliant directions. As such, the tile engaging retaining and alignment means may not apply significant force or any force to the tiles in the compliant directions. On the hand, as stated above, the position of the tile chuck may be altered in the x and y directions as well as rotationally in the x-y plane.

According to one embodiment, the tile chuck may be moved up to four inches both in the x and y directions.

Clamps on the assembly fixture, such as the swinging vacuum clamps discussed above, may prevent the tiles from moving when unengaged by the tile chuck and when not secured to the coverplate, even at least partially.

To help ensure alignment of the tiles with respect to each other and with respect to the coverplate, the position of the tile chuck may be altered in the x-y plane. Accordingly, the present invention may include a plurality of means for altering the position of each tile chuck. For example, each tile chuck may be controlled by a motor 59 for altering the position of the tile chuck in the x direction and a motor 61 for altering the position of the tile chuck in the y direction. The tile chucks may also be controlled by a third motor 63 for rotationally altering the position of each tile chuck in the x-y plane.

Any motor known to those skilled in the art could be utilized to alter the position of the tile via the tile chucks. According to one example, piezoelectric motors may be utilized according to the present invention.

To facilitate the detection of the position of the tiles relative to each other and relative to the coverplate, the tiles and coverplate may be provided with fiducial marks. At least one fiducial mark may be included on each tile as well as on the coverplate. According to one embodiment, each tile may include two fiducial marks. According to one embodiment, the fiducial marks are small round dots.

According to one embodiment, the fiducial marks on the coverplate are small round dots while the fiducial marks on the tiles are small rings. This embodiment typically includes at least one dot on each tile or on the coverplate in each area covered by a tile and a circle on the each tile or the coverplate in a corresponding location. According to such an embodiment, the rings may have an internal diameter slightly larger than the outer diameter of the dots. The tiles are positioned relative to the coverplate by positioning the dots within the rings.

The alignment of the tiles relative to each other and relative to the coverplate may be determined by cameras. Accordingly, the present invention may include at least one camera 65 for determining a position of the fiducial marks on the tiles relative to each other and/or relative to fiducial marks on the coverplate. According to one embodiment, the present invention includes at least one camera arranged in association with each tile.

The embodiment shown in FIGS. 2 and 3 includes two cameras associated with each tile and tile chuck. The camera (s) may be mounted to the machine frame as in the embodiment shown in FIGS. 2 and 3. The cameras may be focusable on the fiducial marks on the coverplate and the tiles.

According to one embodiment, the cameras are moved up and down. According to another embodiment, the cameras include focusing objects to accomplish this task. A variety of cameras may be utilized according to the present invention. For example, one embodiment of the present invention includes CCD cameras. The position of the cameras relative to the tiles may be altered, depending upon the size of the tiles and ultimate size of the display being formed with the apparatus.

The present invention may include a computerized control for controlling movement of the chucks and, hence, the tiles.

The computerized control may also control focusing of the camera(s). Along these lines, once the relative positions of the fiducial marks on the tiles and/or the coverplate are determined, the control system may determine the correct amount of movement in the x, y and theta directions for each tile necessary to cause the tiles to move to the proper location.

The tiles may be moved one at a time. Alternatively, two or more tiles may be moved simultaneously. After the tiles are moved, the alignment of the tiles and/or coverplate may again be checked utilizing the camera(s). If necessary, one or more of the tiles may again be moved to ensure that they are aligned within a desired tolerance. The alignment verification and processes may be carried out as many times as necessary to ensure alignment of the tiles and coverplate.

According to the embodiment that includes the dot and circle fiducial marks, the tiles are arranged such that the fiducial marks on the coverplate and the tiles are aligned so as to be coaxial within a tolerance of plus or minus about 0.0005 inch, or whatever tolerance is dictated by the geometry of the pixels and grid pattern.

To facilitate alignment of the tiles and coverplate, at least one light source may be arranged on an opposite side of the tiles and coverplate from the camera(s). By arranging a light source in such a manner, a light source may provide back illumination to yield a high contrast image of the fiducial marks on the coverplate and tiles. The apparatus of the present invention may include a plurality of light sources to illuminate various portions of the tiles and coverplate.

Once the tiles are properly aligned relative to each other and relative to the coverplate, the tiles may be at least partially secured to the coverplate. The at least partial securing may be accomplished by at least partially curing at least a portion of the bonding material between the tiles and the coverplate. How the at least partial curing is carried out may depend upon the type of bonding material being utilized. For example, the bonding material may be curable with ultraviolet light. According to such an embodiment, the apparatus according to the present invention may include at least one source of ultraviolet radiation 66, shown in FIGS. 2 and 3, for curing the bonding material. To accomplish the at least partial securing of the tiles to the coverplate, the bonding material may be spot cured in at least one location between each tile and the coverplate.

According to one embodiment, the present invention includes a plurality of UV light guides mounted outside the perimeter of the tiles to conduct ultraviolet radiation onto spots that will fall outside of the viewing area of the display panel when the display panel is completed. Although the bonding material may be fully cured at a later time, it may still necessary to spot cure the bonding material so as to help stabilize or immobilize the tiles relative to the coverplate.

Partial spot curing may be utilized to partially secure the tiles to the coverplate, the spot curing is carried out outside of the functional area of the display panel since a halo of partially cured bonded material may result around the area of spot curing. Such halo areas would be objectionable if they fell within the viewing area of the finished display. However, if means and/or bonding material(s) are known or developed that would not produce such a halo, the spot curing may take place anywhere on the tiles.

Additionally, the bonding material may be curable in another manner. For example, the bonding material may be heat curable. Accordingly, the invention may include means for applying heat to spot cure the bonded material. The at least partial curing of a heat-curable bonding material may take place outside of the viewable area of the display as well.

The present invention may also include any other means for at least partially curing the bonding material.

After alignment and partial securing of the tiles to the coverplate, the tile and coverplate assembly may be moved via the assembly fixture to the next station. In the embodiment shown in FIG. 1, the next station is a tiled assembly bonding material dispensing station. At the station, bonding material may be applied to the upper surface of the tiles for later bonding a backplate to the tiles. Accordingly, the tiled assembly bonding material dispensing station may include a bonding material dispenser.

The embodiment illustrated in FIG. 1 includes an apparatus for dispensing the bonding material on the surface of the tiles or backplate. Any type of apparatus may be utilized for dispensing the bonding material. The apparatus in the embodiment shown in FIG. 1 includes an x-y bonding material dispenser for dispensing bonding material on the tiles at least partially secured to the coverplate. Such a dispenser typically includes two arms 23 and 25. The arms may interact with each other. For example, the arm 25 may ride along the arm 23.

The bonding material dispenser also typically includes a dispensing nozzle 27 that may ride along the arm 25. Accordingly, the bonding material dispenser may dispense bonding material at any point on the surface of the tiles by altering the position of arm 25 and nozzle 27.

The adhesive may be applied according to any known pattern. For example, the bonding material could be substantially uniformly deposited on the entire surface of the coverplate. According to one pattern, the bonding material is applied to the surface of the tiles in a single star pattern or asterisk pattern.

The star pattern may be generated on the coverplate by controlling the path of the nozzle and the nozzle's on/off control. The star pattern may be created by depositing bonding material from the nozzle while simultaneously moving the nozzle in repeated straight lines, including horizontal, vertical, and angled 45 degrees from the horizontal and vertical lines. Such lines of bonding material may be formed such that the lines intersect at a point where the center of a tile will be arranged.

The nozzle during such an operation will be on during the movement along the lines described above. Otherwise, the nozzle will be off such that bonding material will not flow from the nozzle. The volume of bonding material that will be dispensed from the nozzle may be a function of flow rate of bonding material from the nozzle. The volume of bonding material that will be dispensed from the nozzle may also be a function of the velocity of the nozzle as it deposits the lines of bonding material. These parameters may be easily determined through routine experimentation. Typically, the deposition of the bonding material is carried out so as to ensure that the entire mating surfaces of the tile and the coverplate are covered with adhesive.

Examples of bonding materials that may be utilized to secure the tiles to the coverplate include adhesives. Examples of suitable adhesives include LUXTRAK 4031, LUXTRAK 4170 and LUXTRAC 4116, all available from Ablestik Labs, or VLC701, available from Glotrax Incorporated. Preferably, the bonding material is optically clear when cured.

After dispensing of the bonding material on the tiles, the assembly fixture may be transported to a backplate placement and bonding material dwell station.

Unlike the bonding material dispensed on the coverplate prior to placing the tiles on the coverplate, the bonding material dispensed onto the surface of the tiles may be dispensed in a single star or asterisk pattern, as described above.

After the adhesive is deposited on the tiles, the tiled coverplate may be moved via the assembly fixture to the next station, which may be a backplate placement and bonding material dwell station 31. In anticipation of the arrival of the tiled coverplate with applied adhesive at the backplate placement and bonding material dwell station, the backplate may be loaded onto a backplate fixture. Similar to the tile load fixture, the backplate load fixture may include guide strips or posts. The backplate may be biased up against the guide posts utilizing air cylinder locators. A vacuum source or other clamps may be utilized to maintain the backplate in place on the backplate load fixture.

The backplate load station may include a bonding material dispenser for depositing at least a small portion or at least a seed dot of a bonding material 15 on the lower surface of the backplate, in other words, the surface facing away from the viewer of the orientation shown in FIG. 1. The bonding material seed dot dispenser, therefore, typically is arranged such that it can access the underside of the backplate.

The coverplate, tiles and backplate may then be transported to a backplate align and secure station 33. At the backplate align and secure station, the backplate may be aligned on the tiles just as the tiles were aligned on the coverplate.

To align the backplate, the backplate may be engaged by means for engaging, supporting and altering the position of the backplate. The means for engaging supporting and altering the position of the backplate may be substantially similar to the apparatus as described above for engaging, supporting and altering the position of tiles. In fact, the same apparatus may be utilized by simply arranging the assembly fixture back under the station 17.

Alternatively, as in the embodiment illustrated in FIG. 1, a single apparatus similar to that described above for engaging, supporting and altering a position of a single tile may be utilized with the backplate. The apparatus for engaging, supporting, and altering the position of the backplate may be larger in some respects. For example, to engage the center of the backplate, the arm 60 may be longer than a corresponding arm on the apparatus to engage, retain, and align the smaller tiles. The area that a vacuum is applied to the backplate may also be larger since the backplate 102 is larger and may also be heavier than an individual tile 100.

Additionally, the operation of the apparatus for engaging, supporting and altering the position of the backplate may be substantially the same as the means for engaging, supporting and altering the position of the tiles. In view of the similarity of the apparatus and operation of the apparatus for engaging, supporting and altering the position of the backplate, to the apparatus for performing a similar function to the tiles, the apparatus and operation need not be discussed in further detail here.

Additionally, the method for aligning the backplate is similar to the method for aligning the tiles and therefore, reference is made to the above description of the tile aligning. For example, the backplate may include at least one fiducial marks to align with at least one fiducial mark provided on one of the tiles or the coverplate.

Once the backplate is properly positioned on the tiles, the backplate may be at least partially secured to the tiles. Just as the tiles were at least partially secured to the coverplate, the backplate may similarly be at least partially secured to the tiles. Just as with the tiles, the at least partial securing may be carried out by at least partially curing at least a portion of the bonding material between the backplate and the tiles. Similar to the at least partial curing of the bonding material between the tiles and the coverplate, if the backplate is secured to the tiles by at least partially securing the bonding material, preferably, the at least partial curing takes place on an area that will fall outside the viewable area of the display when the display is completed. Once again, reference is made to the discussion above regarding the at least partial securing of the tiles to the coverplate regarding the at least partial securing of the backplate to the tiles.

After positioning and at least partially securing the backplate to the tile, the coverplate, tile, and backplate assembly may be transported to a full bonding station where the coverplate, tiles and backplate are fully bonded to each other. Typically, the full bonding station includes whatever means is necessary for effecting the full cure. For example, if the bonding material is UV curable, then the full bonding station may include a source of UV radiation. On the other hand, if the bonding material were heat curable, then the full bonding station could include a heat source. In other words, the full bonding station typically includes whatever means is necessary to fully cure the bonding material.

After the full bonding of the coverplate, tiles and backplate has taken place, the assembly may be transported to a final assembly and output station 37. At the final assembly and output station, the assembled panel can be unloaded and placed onto a carrier suitable for transport to another station with another apparatus or the same apparatus for further processing the assembled panel. Perhaps the assembled panel might be stored for future use and be transported to a storage container for assembly.

After unloading the assembled panel, the assembly fixture may be transported to a staging/cleaning station. At this station, which may be a part of the entire system or may be a separate apparatus, the assembly fixture, if necessary, may be cleaned to remove any cured or uncured bonding material or any other contaminants that may be on the assembly fixture. Such contaminants preferably are removed prior to reuse of the assembly fixture.

FIG. 1 illustrates assembly fixture being conveyed back to the beginning of the process, as indicated by arrows 103.

FIG. 1 illustrates a system according to the present invention that includes a station for performing each of the functions during the process of performing the flat panel display from a plurality of similar display panels or tiles. However, it is not necessary that a system according to the present invention include all of the stations illustrated in the embodiment shown in FIG. 1. For example, some of the functions could be carried out outside of the system. Alternatively, some embodiments may include stations that combine functions from the separate stations than the embodiment shown in FIG. 1.

The present invention also includes a method of aligning or attaching together a plurality of thin film transistor tiles for constructing a flat panel display. The method includes placing a coverplate that the tiles are to be attached to on a coverplate support at a coverplate loading station. A bonding material for bonding the tiles to the coverplate may then be applied onto the coverplate at a coverplate bonding material dispensing station.

Next, a plurality of tiles may be arranged on a tile support at a tile loading station. The tiles may then be interconnected with a tile aligner. The tiles may be arranged on the coverplate at a tile placement station. The tiles may then be aligned relative to each other and to the coverplate by the tile aligner. After alignment, the tiles may be at least partially bonded to the coverplate at a tile aligning and securing station.

After partial securing of the tiles to the coverplate, a bonding material may be applied to a surface of the tiles opposite the side of the tiles that the coverplate is bonded to at a tile assembly bonding material dispensing station. Then, a backplate may be arranged on the tiles at a backplate placement station. Subsequently, the backplate may be at least partially bonded to the tiles at a backplate aligning and securing station. The coverplate. tiles and backplate may then be fully bonded together at a full bonding station.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

We claim:

1. A method of aligning and attaching together a plurality of thin film transistor tiles for constructing a flat panel display, the method comprising the steps of:

placing a coverplate that the tiles are to be attached to on a coverplate support at a coverplate loading station;

applying a bonding material for bonding the tiles to the coverplate onto the coverplate at a coverplate bonding material dispensing station, wherein said bonding material is optically clear and wherein said applying is performed such that the entire mating area of said tile and said coverplate is covered with said bonding material     arranging a plurality of tiles on a tile support at a tile loading station;

connecting the tiles to a tile aligner;

arranging the tiles on the coverplate at a tile placement station;

aligning the tiles relative to each other and the coverplate by the tile aligner and at least partially onding the tiles to the coverplate at a tile aligning and securing station;

applying a bonding material to a surface of the tiles opposite the side that the coverplate is bonded to a tile assembly bonding material dispensing station, wherein said bonding material is optically clear and wherein said applying is performed such that the entire mating area of said tile and said backplate is covered with said bonding material; arranging a backplate on the tiles at a backplate placement station;

at least partially bonding the backplate to the tiles at a backplate aligning and securing station; and fully bonding the coverplate and the backplate to the tiles at a full bonding station.

2. The method according to claim 1 which further comprises applying a seed dot of bonding material to a surface of the tiles.

3. The method according to claim 1 wherein the tiles are arranged about 0.0625 inch from each other.

4. The method according to claim 1 wherein the display includes four tiles.

5. The method according to claim 1 further comprising detecting a position of the tiles relative to each other and relative to the coverplate.

6. The method according to claim 1 further comprising at least partially curing the bonding material between the tiles and the coverplate in an area that will be outside of the viewable area of the display for at least partially bonding the tiles to the coverplate.

7. The method according to claim 1 wherein the bonding material is curable with ultraviolet radiation.

8. The method according to claim 1 further comprising detecting a position of the backplate relative to the tiles and relative to the coverplate.

9. The method according to claim 1 further comprising at least partially curing the bonding material between the backplate and the tiles in an area that will be outside of the viewable area of the display for at least partially bonding the backplate to the tiles.

10. The method according to claim 9, wherein the bonding material is curable with ultraviolet radiation.

11. The method according to claim 1 wherein the bonding material between the coverplate and the tiles and between the tiles and the backplate are curable with ultraviolet radiation.

* * * * *